March 17, 1931. W. H. FREEMAN 1,796,326
GRAIN SEPARATOR
Filed Dec. 26, 1923 2 Sheets-Sheet 2

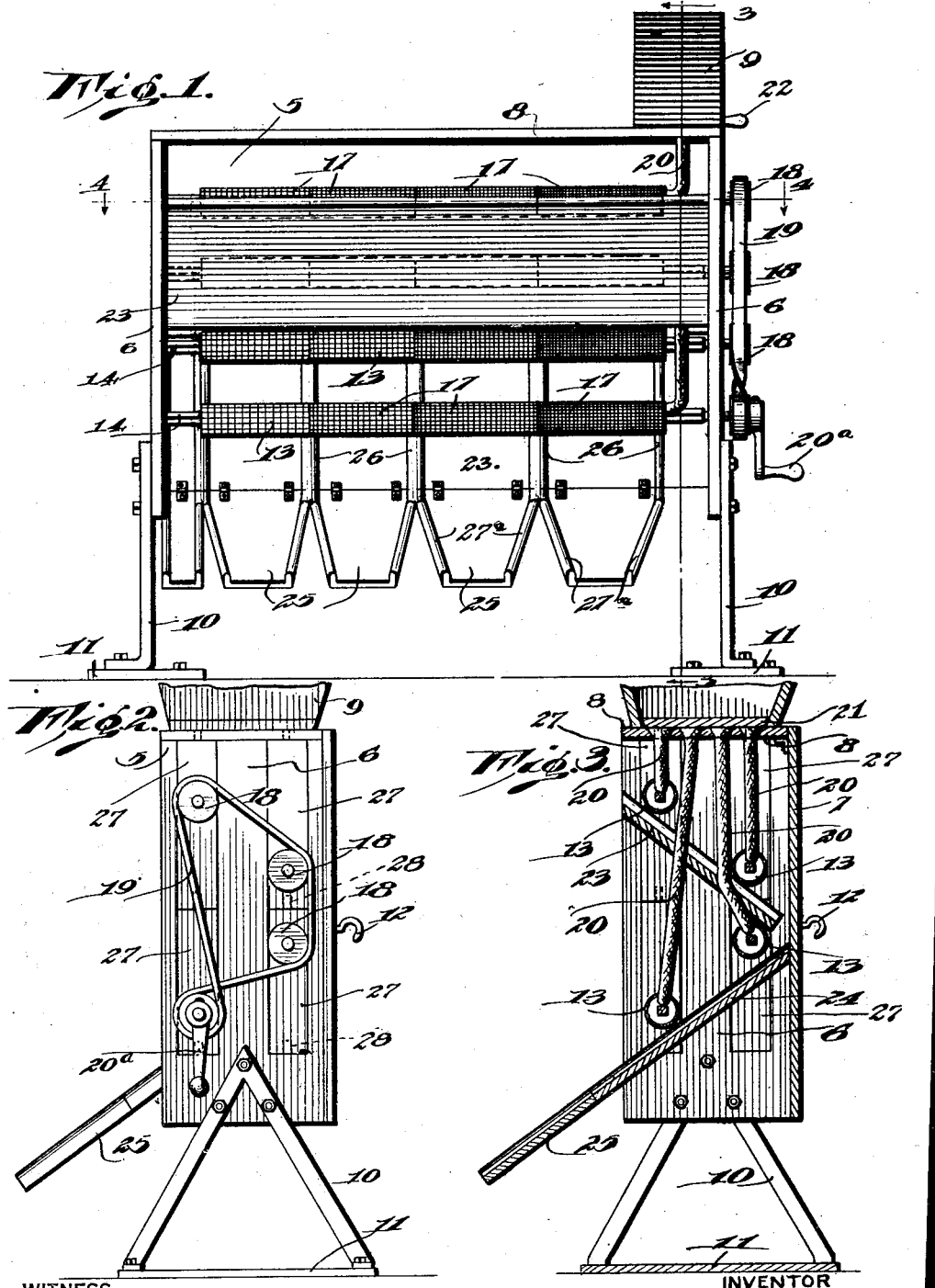

WITNESS

INVENTOR
W. H. Freeman,
BY
ATTORNEY

Patented Mar. 17, 1931

1,796,326.

UNITED STATES PATENT OFFICE

WILLIAM H. FREEMAN, OF PEEBLES, OHIO

GRAIN SEPARATOR

Application filed December 26, 1928. Serial No. 328,484.

My invention relates to grain or seed classifying machines, and more particularly to the type embodying rotatable reticulated cylinders.

An object of the present invention is to provide a machine of this character having a plurality of parallel reticulated cylinders whose reticulations are graduated from one end of the cylinder to the other, so that various sized grains will pass through the cylinders as it is advanced longitudinally therethrough.

Further the invention provides inclined chutes whereby the various sizes of grain discharging from each cylinder will be carried to suitable receptacles placed at the discharge ends of the chutes.

It is also an object of the invention to provide interchangeable or removable reticulated cylinders of various sized mesh, whereby to adapt the machine for use with different characters of seeds or grains.

Figure 4:
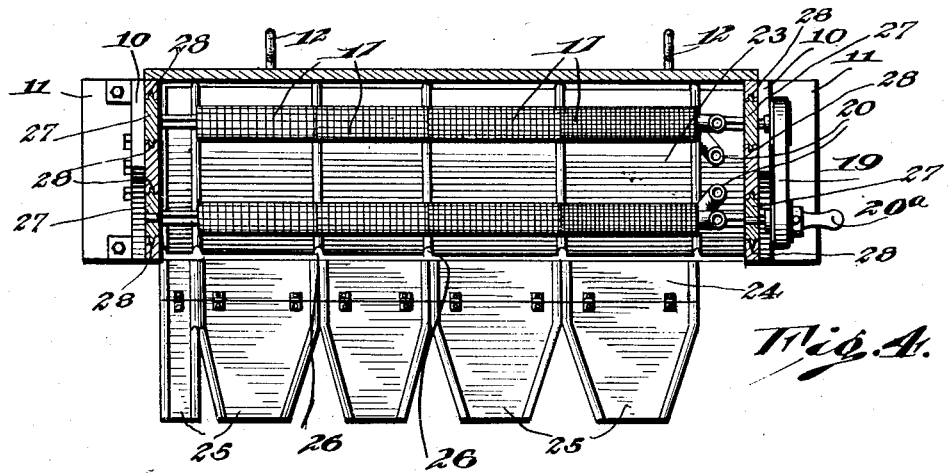
Figure 5:
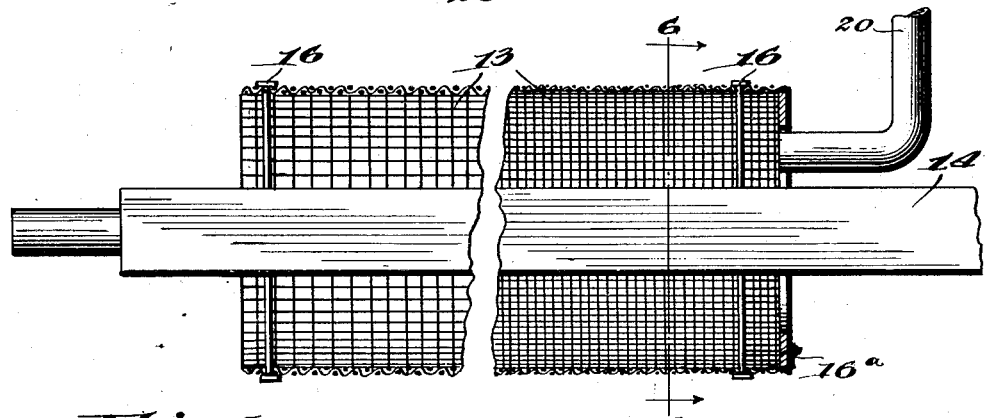
Figures 6, 7:
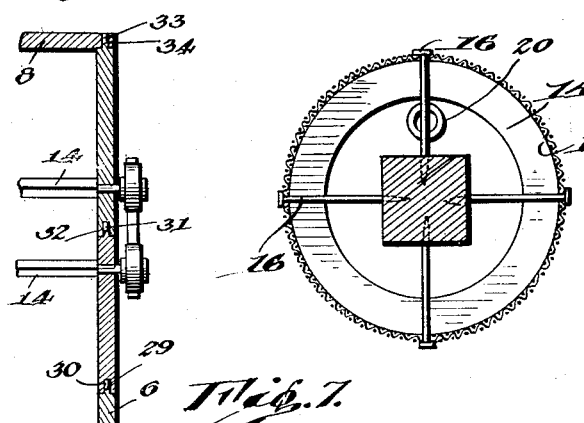

With the preceding and other objects and advantages in mind the invention consists in the usual combination of elements, constructions and arrangements of parts and operations to be hereinafter more specifically referred to, claimed, and illustrated in the accompanying drawings, wherein:

Figure 1 is a front elevation of a grain classifying machine built in accordance with my invention, Figure 2 is an end elevation of the same, Figure 3 is a vertical section taken on line 3—3 of Figure 1, Figure 4 is a horizontal section taken on line 4—4 of Figure 1, Figure 5 is an enlarged detail view partly in longitudinal section, and partly in elevation, of one of the reticulated cylinders and its corresponding grain supply tube, Figure 6 is a vertical section taken on line 6—6 of Figure 5, and Figure 7 is a detail partial vertical section taken on one end of the stand.

Referring to the invention in detail, a stand 5 is provided having spaced vertical end walls 6, a vertical rear wall 7, and a hinged top 8 carrying a hopper 9 at one end.

The stand 5 is normally supported by inverted U-shaped brackets 10 attached to base plates 11, and the vertical end walls 6. However, when the machine is not in use, the brackets 10 are removed, and the stand hung upon a suitable support by means of laterally projecting hooks 12 carried by the rear wall 7. A plurality of horizontally disposed reticulated cylinders 13 are arranged within the stand with their ends removably journaled in the end walls 6. As illustrated in Figure 3, these cylinders are arranged in vertically alined pairs. The cylinders of one pair are located a relatively great distance from each other, while the cylinders comprising the other pair are relatively close.

Each cylinder comprises a rectangular shaft 14 extending centrally through a cylindrical sheet of reticulated material 15. At its ends the reticulated material is attached to the shaft by radially disposed headed fastenings 16 engaging the shaft and reticulated material, respectively. At its inner end the cylindrical reticulated sheet carries an internal annular flange 16ᵃ to prevent grain from discharging from the cylinder while it is being classified. As particularly illustrated in Figure 4, the reticulated cylinders have areas of graduated thicknesses designated at 17. In other words, the mesh of the areas 17 is graduated in size from one end of the cylinders to the other, so that various sized grain will pass therethrough as it is fed longitudinally through the cylinders.

In order to rotate the reticulated cylinders, each of the shafts 14 carries a drive pulley 18 upon its outer end which will engage a drive belt 19. While in this instance a crank handle 20 is fixed to one of the shafts 14 to drive the belt 19, one of these shafts may be operatively connected with a suitable source of power, if desired.

Grain to be departed is conducted from the hopper by way of a plurality of flexible tubes 21 communicating with the hopper and inner end of each of the reticulated cylinders. A slide valve 21 is arranged in the bottom of the hopper and is equipped with a handle 22 which projects laterally from one side of the hopper. When it is desired to permit grain to flow into the various cylinders the slide valve is drawn outwardly.

An inclined chute 23 is supported from the end walls 6 below the two upper reticulated cylinders and extends to a point close to the rear wall 7. Also supported by the end wall 6, but below the lower reticulated cylinders and diverging from the chute 23 is a chute 24 whose upper end extends to the rear wall 7. The lower end of the chute 24 projects beyond the end walls 6 and carries a plurality of hinged extensions 25, the latter being capable of being swung rearwardly to an out of the way position when the machine is not in use. To maintain the various sized grain separated after passing through the areas 17 of the cylinders, the chutes 23 and 24 are divided by upstanding parallel walls 26 extending transversely of the upper faces of the chutes. The extensions 25 are also formed with upstanding walls 27 which extend to the upstanding walls 26 of the chute 24.

As above stated, the cylinders are removably mounted. This is particularly desirable as it permits cylinders of various sized mesh to be utilized according to the character of seeds or grains to be classified. To provide for the removability of the cylinders, they are journaled in panels 27 which are removably mounted in the end walls of the stand by means of tongue and groove connections 28. It will be observed that these panels are arranged in horizontally alined pairs with the uppermost pair supporting the uppermost cylinders, while the lower pair supports the lower cylinders.

At their lower ends the lowermost panels are formed with recesses 29, which receive upstanding dowel pins projecting vertically from the end walls 6, while the adjacent ends of the panels are connected by similar pins 31 projecting from the upper ends of the lower panels, and received in recesses 32 formed in the lower ends of the upper panels. At their upper ends, the upper panels are formed with upstanding dowel pins 33, which are received in openings 34 in the ends of the hinged top 8.

In the operation of the machine, the reticulated cylinders are slowly rotated by means of the handle 20 and grain conducted from the hopper to the various cylinders. As the cylinders are rotated, the grain is moved from one end of the cylinders to the other causing wheat to pass from the first areas 17. As the operation is continued, grain of various sizes pass through the graduated areas. It will be observed that the various classes of grain will be carried to suitable receptacles placed beneath the extensions 25. Any waste such as small sticks or white caps continue through the cylinders and is discharged from the far ends of the latter.

What is claimed is:

1. In a grain classifying machine, a stand, a chute arranged in the stand and inclined downwardly from the front of the stand to the rear, a second chute arranged in the stand below the first mentioned chute and inclined downwardly from the rear of the stand to the front and adapted to receive material from the first mentioned chute, upstanding parallel walls extending transversely of the chutes to divide the same into separate compartments, horizontally arranged separator cylinders journalled in the stand above each of the chutes and having graduated areas overlying each of the separator compartments whereby grain from corresponding areas of all the cylinders will be conducted to a common point.

2. In a grain classifying machine, a stand, a chute arranged in the stand and inclined downwardly from the front of the stand to the rear, a second chute arranged in the stand below the first mentioned chute and inclined downwardly from the rear of the stand to the front and adapted to receive material from the first mentioned chute, upstanding parallel walls extending transversely of the chutes to divide the same into separate compartments, horizontally arranged separator cylinders journalled in the stand above each of the chutes and having graduated areas overlying each of the separator compartments whereby grain from corresponding areas of all the cylinders will be conducted to a common point, and means for conducting grain to the cylinders.

3. In a grain classifying machine, a stand a chute arranged in the stand and inclined downwardly from the front of the stand to the rear, a second chute arranged in the stand below the first mentioned chute and inclined downwardly from the rear of the stand to the front and adapted to receive material from the first mentioned chute, upstanding parallel walls extending transversely of the chutes to divide the same into separate compartments, horizontally arranged separator cylinders journalled in the stand above each of the chutes and having graduated areas overlying each of the separator compartments whereby grain from corresponding areas of all the cylinders will be conducted to a common point, a hopper arranged upon the stand, and a plurality of conduits leading therefrom and each having communication with one of the cylinders.

4. In a grain classifying machine, a stand having side and end walls, a pair of cooperating chutes arranged in the stand, and extending the entire length thereof, one of the chutes being inclined downwardly from the front of the stand to the rear, the second chute being disposed below the first chute and inclined downwardly from the rear of the stand to the front, so that material from the first mentioned chute will discharge thereon, and horizontally arranged separator drums journalled in the stand above each of the chutes.

W. H. FREEMAN.